US012580397B2

(12) United States Patent
    Lin

(10) Patent No.: US 12,580,397 B2
(45) Date of Patent: Mar. 17, 2026

(54) ELECTRONIC DEVICE

(71) Applicant: InnoLux Corporation, Miao-Li County (TW)

(72) Inventor: Mei-Chun Lin, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 827 days.

(21) Appl. No.: 17/872,689

(22) Filed: Jul. 25, 2022

(65) Prior Publication Data

US 2023/0066961 A1 Mar. 2, 2023

(30) Foreign Application Priority Data

Aug. 25, 2021 (CN) ......................... 202122009869.0

(51) Int. Cl.
    *H02J 7/00* (2006.01)
    *H02J 50/00* (2016.01)
    *H02J 50/10* (2016.01)
    *H04R 1/02* (2006.01)

(52) U.S. Cl.
    CPC .......... *H02J 7/0044* (2013.01); *H02J 50/005* (2020.01); *H02J 50/10* (2016.02); *H04R 1/026* (2013.01)

(58) Field of Classification Search
    CPC ................................ H02J 7/0044; H02J 50/10
    USPC .......................................................... 320/107
    See application file for complete search history.

(56) References Cited

U.S. PATENT DOCUMENTS

| | | | | |
|---|---|---|---|---|
| 10,075,017 | B2 * | 9/2018 | Leabman | ................. H02J 50/23 |
| 11,121,590 | B1 * | 9/2021 | Patel | .................. G06K 7/10297 |
| 2007/0002533 | A1 * | 1/2007 | Kogan | .................. G06F 1/1632 |
| | | | | 361/679.41 |
| 2008/0051155 | A1 * | 2/2008 | Lee | .................... H04M 1/72409 |
| | | | | 455/569.1 |
| 2013/0113421 | A1 * | 5/2013 | Han | ....................... H02J 7/0042 |
| | | | | 320/108 |
| 2014/0375186 | A1 * | 12/2014 | Tarnow | .................. F16M 11/10 |
| | | | | 206/576 |
| 2014/0375248 | A1 * | 12/2014 | Takahashi | ............. H02J 7/0044 |
| | | | | 29/854 |
| 2015/0124996 | A1 * | 5/2015 | Levinsohn | ............... H04R 1/08 |
| | | | | 381/91 |
| 2016/0099614 | A1 * | 4/2016 | Leabman | ................ H02J 50/80 |
| | | | | 307/104 |
| 2017/0339266 | A1 * | 11/2017 | Pierce | ...................... G06F 3/147 |
| 2020/0021138 | A1 * | 1/2020 | Yeo | ......................... H02J 50/12 |
| 2021/0006888 | A1 * | 1/2021 | Geng | .................. H04R 1/1041 |
| 2021/0144478 | A1 * | 5/2021 | DeCastro | ............... G06F 3/167 |

* cited by examiner

*Primary Examiner* — Suchin Parihar
(74) *Attorney, Agent, or Firm* — MUNCY, GEISSLER, OLDS & LOWE, P.C.

(57) ABSTRACT

An electronic device includes: a power supply device, a first audio-visual device and a second audio-visual device. The first audio-visual device is detachably connected with the power supply device. The second audio-visual device is detachably connected with the power supply device. When the first audio-visual device is connected with the first power supply device, the power supply device charges the first audio-visual device.

17 Claims, 11 Drawing Sheets

ELECTRONIC DEVICE

CROSS REFERENCE TO RELATED APPLICATION

This application claims the benefits of the Chinese Utility Model Application Serial Number 202122009869.0, filed on Aug. 25, 2021, the subject matter of which is incorporated herein by reference.

BACKGROUND

1. Field of the Disclosure

The present disclosure relates to an electronic device and, more particularly; to an electronic device having audio-visual devices.

2. Description of Related Art

Currently, electronic devices, such as display devices, usually have built-in speakers, but such built-in speakers often cannot provide good sound quality. If an external speaker is used for the electronic device, the external speaker has to be connected to the power supply and the electronic device, respectively, through wires, which may cause a large amount of wires to be exposed, and discarded and caused. In addition, the position of the camera of the current electronic device is usually fixed on the top of the electronic device, and thus the angle that can be used for photographing is limited, which does not meet the actual requirements.

Therefore, there is a need for an improved electronic device to alleviate and/or obviate the aforementioned problems.

SUMMARY

The present disclosure provides an electronic device, which includes: a power supply device, a first audio-visual device and a second audio-visual device. The first audio-visual device is detachably connected to the power supply device. The second audio-visual device is detachably connected to the power supply device. When the first audio-visual device is connected to the power supply device, the power supply device charges the first audio-visual device.

Other novel features of the present disclosure will become more apparent from the following detailed description when taken in conjunction with the accompanying drawings.

DETAILED DESCRIPTION OF EMBODIMENT

Figure 1A:
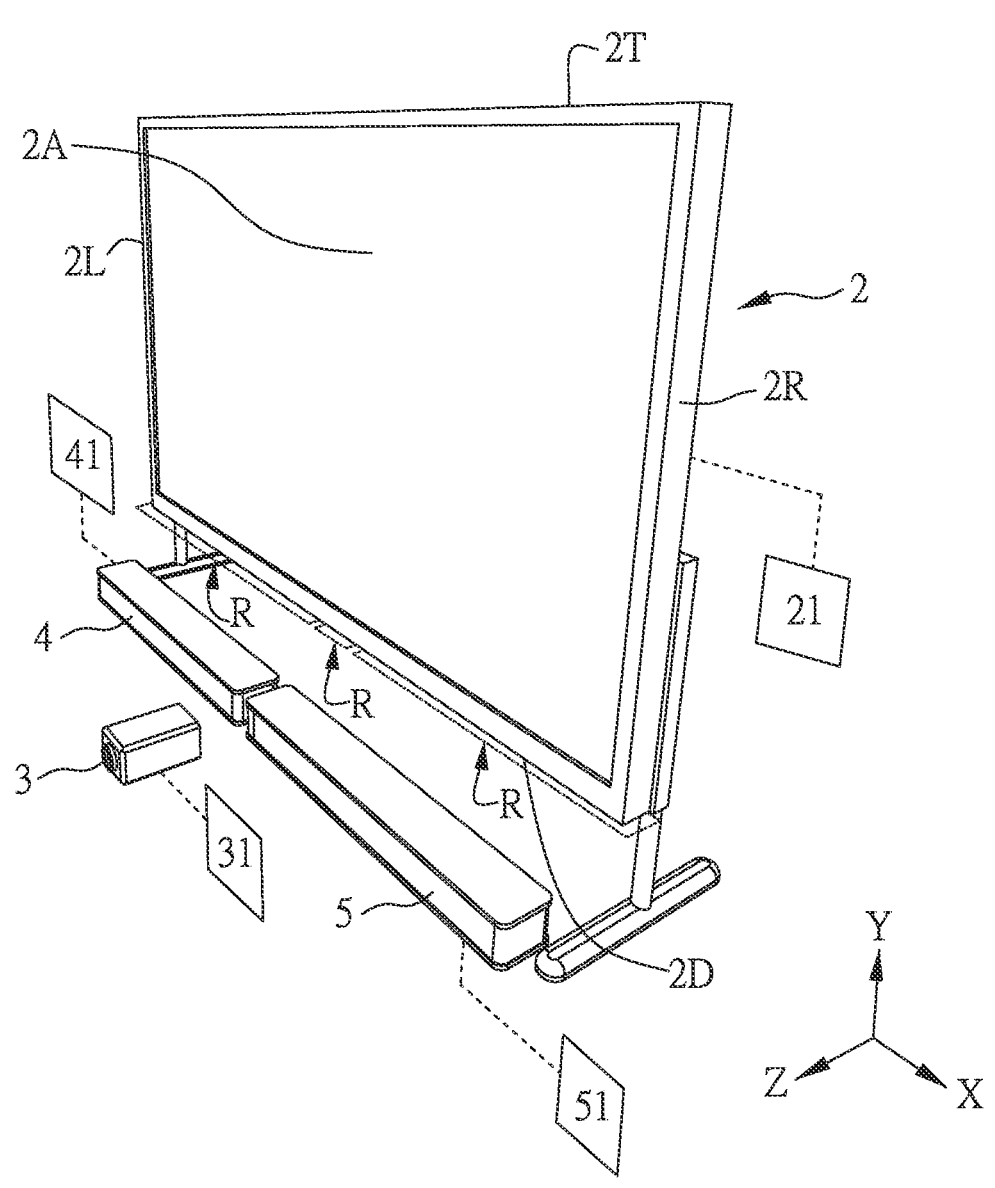
FIG. 1(A) is a schematic diagram of an electronic device according to an embodiment of the present disclosure.

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method. A "first" element and a "second" element may appear together in the same component, or separately in different components. The existence of an element with a larger ordinal number does not necessarily mean the existence of another element with a smaller ordinal number.

In addition, the term "adjacent" used herein may refer to describe mutual proximity and does not necessarily mean mutual contact.

In addition, when a component or a film layer is referred to as being on another component or another film layer, or is referred to as being connected to another component or another film layer, it shall be understood as the component or the film layer is directly disposed on another component or another film layer, or directly connected to another component or another film layer, or there may be other components or film layers between the two (indirectly disposed/connected). On the contrary, when a component or film layer is said to be "directly disposed" on another component or film layer or "directly connected" to another component or film layer, it should be understood that there is no component or film layer inserted between the two. When referring to "on" or "above", it includes the case of direct contact, or there may be one or more other components between the two, in which case there may not be direct contact between the two.

In this disclosure, the thickness, length and width may be measured by using an optical microscope, and the thickness may be measured by the cross-sectional image in an electron microscope, but it is not limited thereto. In addition, there may be a certain error in any two values or directions used for comparison. If the first value is equal to the second value, it implies that there may be an error of about 10% between the first value and the second value. If the first direction is perpendicular to the second direction, the angle between the first direction and the second direction may be 80 to 100 degrees. If the first direction is parallel to the second direction, the angle between the first direction and the second direction may be 0 to 10 degrees.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation, unless specifically defined.

In addition, the description of "when, . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently; but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals.

In addition, in the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value to the second value" indicate that the range includes the first value, the second value, and other values between the first value and the second value.

It should be understood that, without departing from the spirit of the present disclosure, in the following embodiments, the features in different embodiments may be replaced, reorganized or mixed to accomplish other embodiments. The features among various embodiments may be mixed and matched arbitrarily as long as they do not violate the spirit of the disclosure or conflict with each other.

It is noted that, in the present disclosure, the components indicated in each figure are only schematic, and the size, shape, position, relative position, etc. of each component in the figure are only examples but not limitations.

In addition, the electronic device disclosed in the present disclosure may include a display device, an antenna device, a sensing device, a touch display device, a curved display device, or a free shape display device, but is not limited thereto. The electronic device may be a bendable or flexible electronic device. The electronic device may include, for example, liquid crystal, light emitting diode, fluorescence, phosphor, other suitable display media, or a combination thereof, but is not limited thereto. The light emitting diode may include, for example, an organic light emitting diode (OLED), a sub-millimeter light emitting diode (mini LED), a micro light emitting diode (micro LED) or a quantum dot (QD) light emitting diode (for example, QLED, QDLED) or other suitable materials or a combination thereof, but is not limited thereto. The display device may include, for example, a tiled display device, but is not limited thereto. The antenna device may be, for example, a liquid crystal antenna, but is not limited thereto. The antenna device may include, for example, a tiled antenna device, but is not limited thereto. It should be noted that the electronic device may be a combination of the foregoing, but is not limited thereto. In addition, the appearance of the electronic device may be rectangular, circular, polygonal, a shape with curved edges, or other suitable shapes. The electronic device may have peripheral systems such as a driving system, a control system, a light source system, a shelf system, etc., to support a display device, an antenna device, or a tiled device. Hereinafter, the display device will be used as an electronic device fir illustrative purpose only, but the disclosure is not limited thereto.)

Figure 1B:
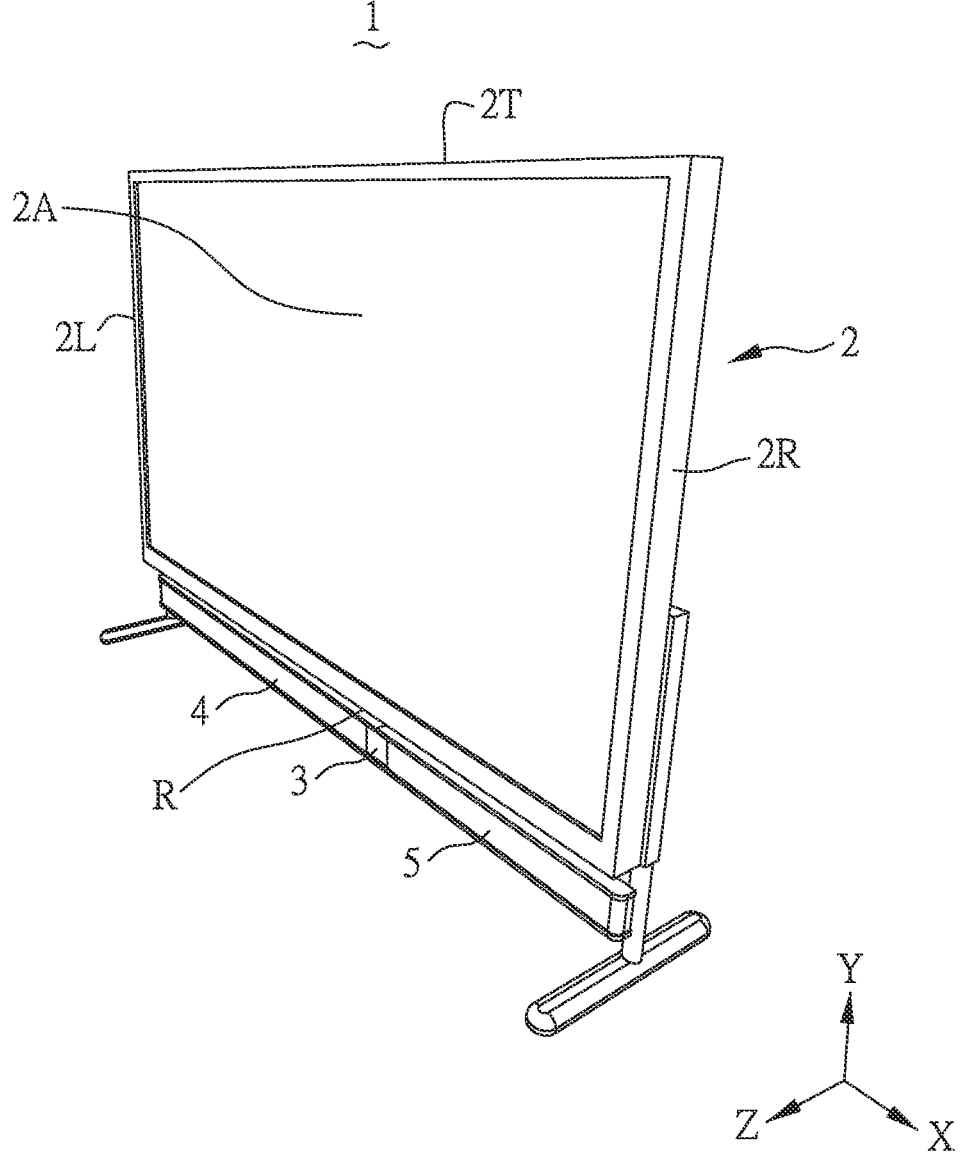
FIG. 1(B) is a schematic diagram illustrating another use state of the electronic device of FIG. 1(A)

Please refer to FIG. 1(A) and FIG. 1(B) at the same time. FIG. 1(A) is a schematic diagram of the electronic device 1 according to an embodiment of the present disclosure, and FIG. 1(B) is a schematic diagram illustrating another use state of the electronic device 1 of FIG. 1(A). The electronic device 1 may include a power supply device 2, a first audio-visual device 3 and a second audio-visual device 4. The first audio-visual device 3 is detachably connected to the power supply device 2, The second audio-visual device 4 is detachably connected to the power supply device 2. When the first audio-visual device 3 is connected to the power supply device 2, the power supply device 2 charges the first audio-visual device 3. In addition, in one embodiment, when the second audio-visual device 4 is connected to the power supply device 2, the power supply device 2 may charge the second audio-visual device 4.

In one embodiment, the electronic device 1 may further include a third audio-visual device 5. The third audio-visual device 5 is detachably connected to the power supply device 2 and, when the third audio-visual device 5 is connected to the power supply device 2, the power supply device 2 may charge the third audio-visual device 5.

For the convenience of description, hereinafter, the electronic device 1 will be described in the form that the electronic device 1 simultaneously includes the first audio-visual device 3, the second audio-visual device 4 and the third audio-visual device 5. However, in actual application, the third audio-visual device 5 may not be limitations of the present disclosure.

In addition, as shown in FIG. 1(A), according to some embodiments, the following description is given by taking the power supply device 2 as a display device, but the present disclosure is not limited thereto. The power supply device 2 may include a bottom surface 2D, a top surface 2T, a first side surface 2L, a second side surface 2R and a display surface 2A, wherein the top surface 21 may be disposed above the display surface 2A, the bottom surface 2D may be disposed below the display surface 2A, the first side surface 2L may be disposed on the left side of the display surface 2A, and the second side surface 2R may be disposed on the right side of the display surface 2A. In addition, for clear illustration, in the present disclosure, the display direction of the display surface 2A of the power supply device 2 is represented by a first direction (Z-direction), the direction extending from the first side surface 2L (left side) to the second side surface 2R. (right side) is represented by a second direction (X-direction), and the direction extending from the bottom surface 2D to the top surface 2T is represented by a third direction (Y-direction).)

Moreover, as shown in FIG. 1(A) and FIG. 1(B), in one embodiment, the power supply device 2 may be provided with at least one power supply region R, and the power supply region R may be disposed on the bottom surface 2D of the power supply device 2, or may be disposed on the top surface 2T, the first side surface 2L or the second side surface 2R, and it is not limited thereto. When the first audio-visual device 3, the second audio-visual device 4 or the third audio-visual device 5 is connected to any power supply area R of the power supply device 2, the power supply device 2 may charge the first audio-visual device 3, the second audio-visual device 4 or the third audio-visual device 5. In one embodiment, the power supply device 2 may charge the first audio-visual device 3, the second audio-visual device 4 or the third audio-visual device 5 by wireless charging, but it is not limited thereto. In one embodiment, the wireless charging may be implemented by using a magnetic induction coupling technology, a magnetic resonance coupling technology or a magnetic near-field control technology, but it is not limited thereto.)

In one embodiment, the type of the power supply device 2 may include, for example, a display device or a charging base, and it is not limited thereto. In one embodiment, the type of the first audio-visual device 3, the second audio-visual device 4 or the third audio-visual device 5 may include an image capturing device (such as but not limited to a video camera, a camera or a lens) or an audio playback device (such as but not limited to a sound box or a speaker), and it is not limited thereto. For the convenience of description, the following will take the power supply device 2 as a display device, the first audio-visual device 3 as a video camera, the second audio-visual device 4 as a first sound box, and the third audio-visual device 3 as a second sound box for exemplary illustration. It should be noted that the aforementioned quantity of the audio-visual devices is only an example. In actual application, the electronic device 1 may be provided with more or less audio-visual devices, for example, provided with as a single video camera or a single sound box, but it is not limited thereto.)

As shown in FIG. 1(A), the first audio-visual device 3, second audio-visual device 4 and the third audio-visual device 5 may be separated from the power supply device 2. At this moment, the first audio-visual device 3, the second audio-visual device 4 and the third audio-visual device 5 may operate independently; for example, the first audio-visual device 3 may perform image capturing, and the second audio-visual device 4 or the third audio-visual device 5 may play audio, etc., and it is not limited thereto. In addition, in one embodiment, as shown in FIG. 1(A), the first audio-visual device 3 may include a wireless transmission device 31, and may be connected to a remote device (not shown) through the wireless transmission device 31, wherein the remote device may be, for example, the communication device of a user, such as but not limited to a mobile phone or a remote control. In other words, the first audio-visual device 3 may be controlled by the remote device, but not limited thereto. In addition, in one embodiment, the power supply device 2 may also include a wireless transmission device 21, the first audio-visual device 3 may also include a wireless transmission device 31, the second audio-visual device 4 may also include a wireless transmission device 41, or the third audio-visual device 5 may also include a wireless transmission device 51, wherein the first audio-visual device 3 may perform signal transmission with the power supply device 2 through the wireless transmission device 31, the second audio-visual device 4 may perform signal transmission with the power supply device 2 through the wireless transmission device 41, and the third audio-visual device 5 may perform signal transmission with the power supply device 2 through the wireless transmission device 51. For example, the power supply device 2 may transmit the audio to be played to the second audio-visual device 4 or the third audio-visual device 5 through the wireless transmission device 21, and the second audio-visual device 4 or the third audio-visual device 5 may play the audio, but it is not limited thereto. In one embodiment, the power supply device 2 may provide audio of different channels (for example, the effect of surround audio) to the second audio-visual device 4 and the third audio-visual device 5, and the second audio-visual device 4 and the third audio-visual device 5 may each be responsible for playing audio of different channels. For example, the power supply device 2 may transmit the left-channel audio to the second audio-visual device 4 for playing the left-channel audio, and transmit the right-channel audio to the third audio-visual device 5 for playing the right-channel audio, but it is not limited thereto. In one embodiment, the wireless transmission technology used by the wireless transmission device 21, 31, 41 or 51 may include, but not limited to, Bluetooth (BT), far infrared (IR) or digital living network alliance (DLNA), etc.)

As shown in FIG. 1(B), the first audio-visual device 3, the second audio-visual device 4 or the third audio-visual device 5 may be connected to the power supply device 2. At this moment, the first audio-visual device 3, the second audio-visual device 4 or the third audio-visual device 5 may each perform operation, and the power supply device 2 may charge the first audio-visual device 3, the second audio-visual device 4 or the third audio-visual device 5. In one embodiment, the connection between the power supply device 2 and the first audio-visual device 3, the second audio-visual device 4 or the third audio-visual device 5 may be achieved through magnetic attraction; for example, a magnetic member may be provided inside the power supply device 2, the first audio-visual device 3, the second audio-visual device 4 or the third audio-visual device 5. In other embodiments, the connection between the power supply device 2 and the first audio-visual device 3, the second audio-visual device 4 or the third audio-visual device 5 may be achieved in other ways; for example, the power supply device 2, the first audio-visual device 3, the second audio-visual device 4 or the third audio-visual device 5 may be provided with physical connectors, and the physical connectors may be connected by, for example, engaging, pivoting, pasting, buttons, etc., but not limited thereto.

Therefore, in comparison with the prior art, the quantity of wires between the power supply device 2 and the audio-visual devices 3-5 of the present disclosure can be reduced, or there are no wires required therebetween.

Next, the details of the power supply device 2, the first audio-visual device 3, the second audio-visual device 4 or the third audio-visual device 5 will be described.)

Figures 2A, 2B, 2C:
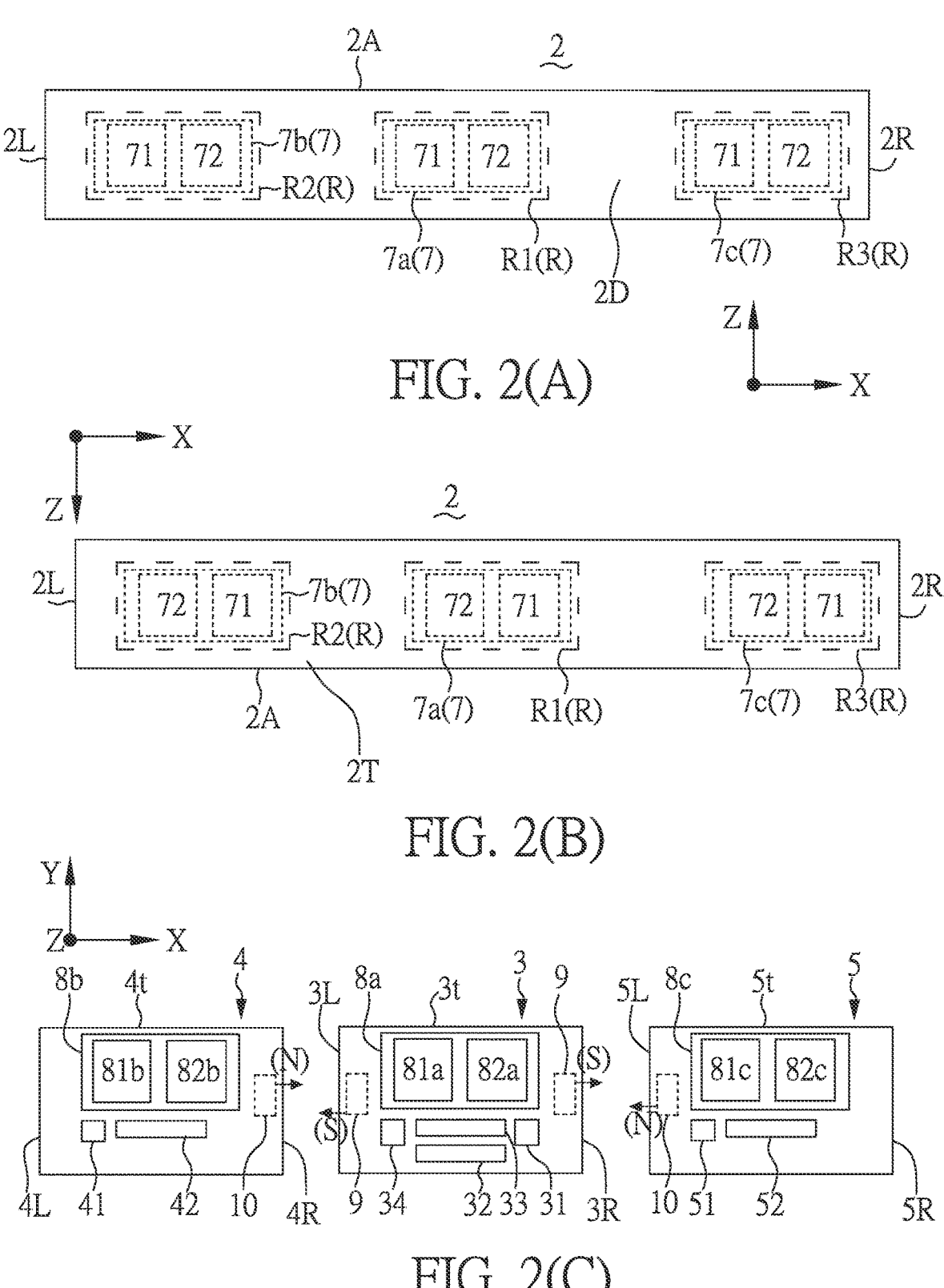
FIG. 2(A) is a schematic diagram illustrating the internal components of a power supply device according to an embodiment of the present disclosure.
FIG. 2(B) is a schematic diagram illustrating the internal components of a power supply device according to another embodiment of the present disclosure.
FIG. 2(C) is a schematic diagram illustrating the internal components of audio-visual devices according to an embodiment of the present disclosure.

FIG. 2(A) is a schematic diagram (block diagram) illustrating the internal components of the power supply device 2 according to an embodiment of the present disclosure, and please refer to FIG. 2(A) and FIGS. 1(A) and 1(B) at the same time. FIG. 2(A) shows the bottom surface 2D of the power supply device 2. It is noted that the sizes, shapes, positions, relative positions, etc. of the components in the figures are only examples but not limitations.

As shown in FIG. 2(A), at least one power supply module 7 may be included inside the power supply device 2. The power supply module 7 may include a discharge coil 71 and a magnetic member 72, and the power supply module 7 may be disposed in the power supply region R. In this embodiment, the power supply module 7 may be disposed inside the power supply device 2 and arranged to be close to the bottom surface 2D of the power supply device 2 or directly on the bottom surface 2D.

In one embodiment, the power supply device 2 may include a plurality of power supply modules 7 and a plurality of power supply regions R, wherein the power supply modules 7 may be arranged in different power supply regions R, for example, each power supply region R having at least one power supply module 7, but it is not limited thereto. In one embodiment, the power supply device 2 may include a first power supply module 7a and a second power supply module 7b, and the first power supply module 7a may be arranged in a first power supply region R1, and the second power supply module 7b may be arranged in a second power supply area R2. The first power supply region R1 and the second power supply region R2 may be disposed on the same surface or different surfaces of the power supply device 2. As shown in FIG. 2(A) in some embodiments, the first power supply region R1 and the second power supply region R2 may be disposed on the same surface of the power supply device 2, for example, on the bottom surface 2D (first surface) of the power supply device 2. In addition, the power supply device 2 may further include a third power supply module 7c arranged in a third power supply region R3, wherein the third power supply region R3 may be disposed on the bottom surface 2D of the power supply device 2. Besides, the magnetic member 72 of each power supply module 7 may have the same magnetic polarity, but it is not limited thereto.

FIG. 2(B) is a schematic diagram (block diagram) illustrating the internal components of the power supply device 2 according to another embodiment of the present disclosure, and please refer to FIG. 2(A) and FIGS. 1(A) to 2(A) at the same time. FIG. 2(B) shows the top surface 2T of the power supply device 2. Since the features of the components in the embodiment of FIG. 2(B) can be applied to the description for the embodiment of FIG. 2(A), only the differences between the embodiment of FIG. 2(B) and the embodiment of FIG. 2(A) will be described below.

As shown in FIG. 2(B), the power supply module 7 may be arranged inside the power supply device 2, and is arranged to be close to the top surface 2T of the power supply device 2 or directly on the top surface 2T. In other words, the power supply region R may be disposed on the top surface 2T of the power supply device 2. Therefore, the first power supply region R1, the second power supply region R2 and the third power supply region R3 may be disposed on the top surface 2T of the power supply device 2.

Figure 3A:
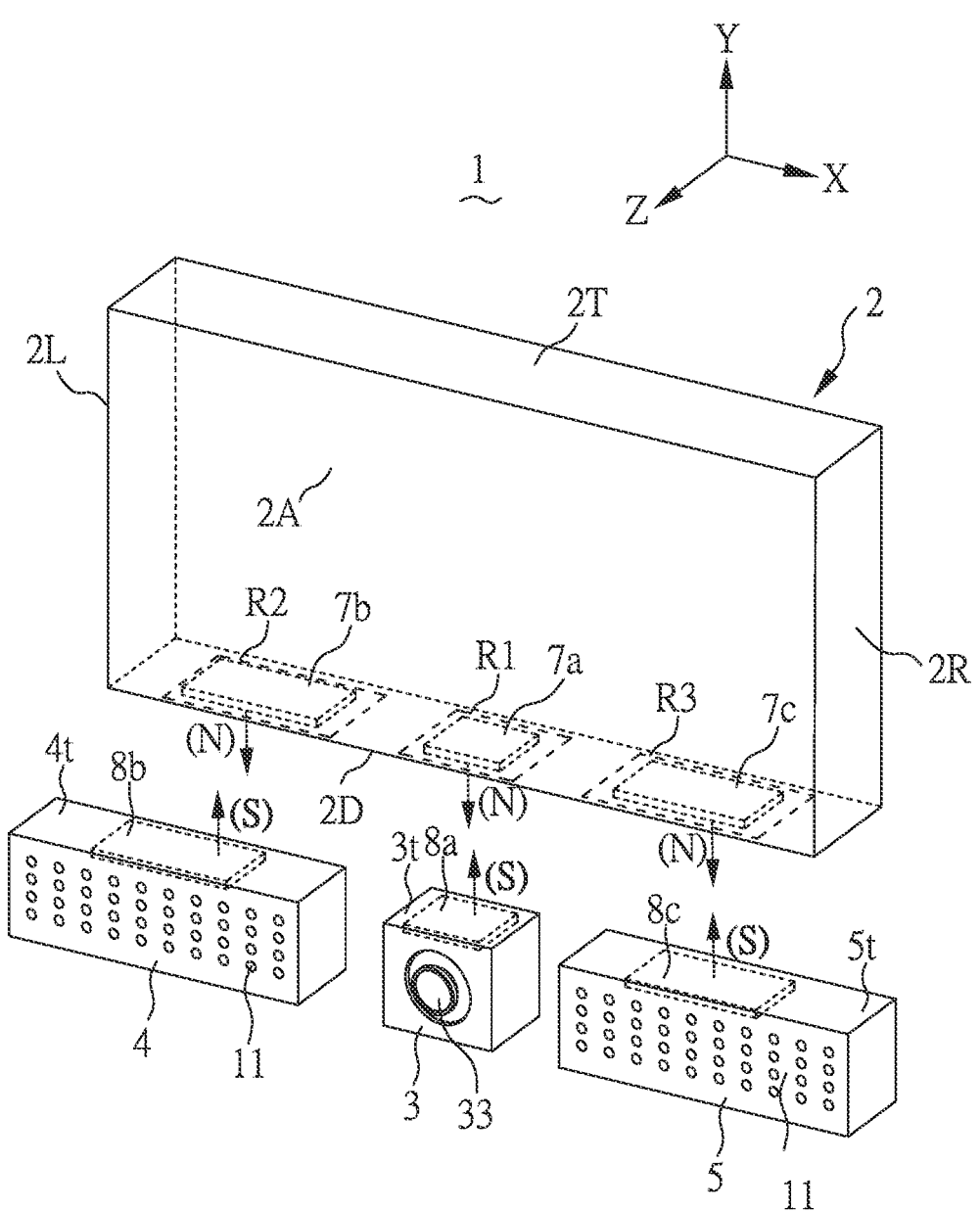
FIG. 3(A) is a perspective view of the configuration for the power supply device and audio-visual devices according to an embodiment of the present disclosure.
Figure 3B:
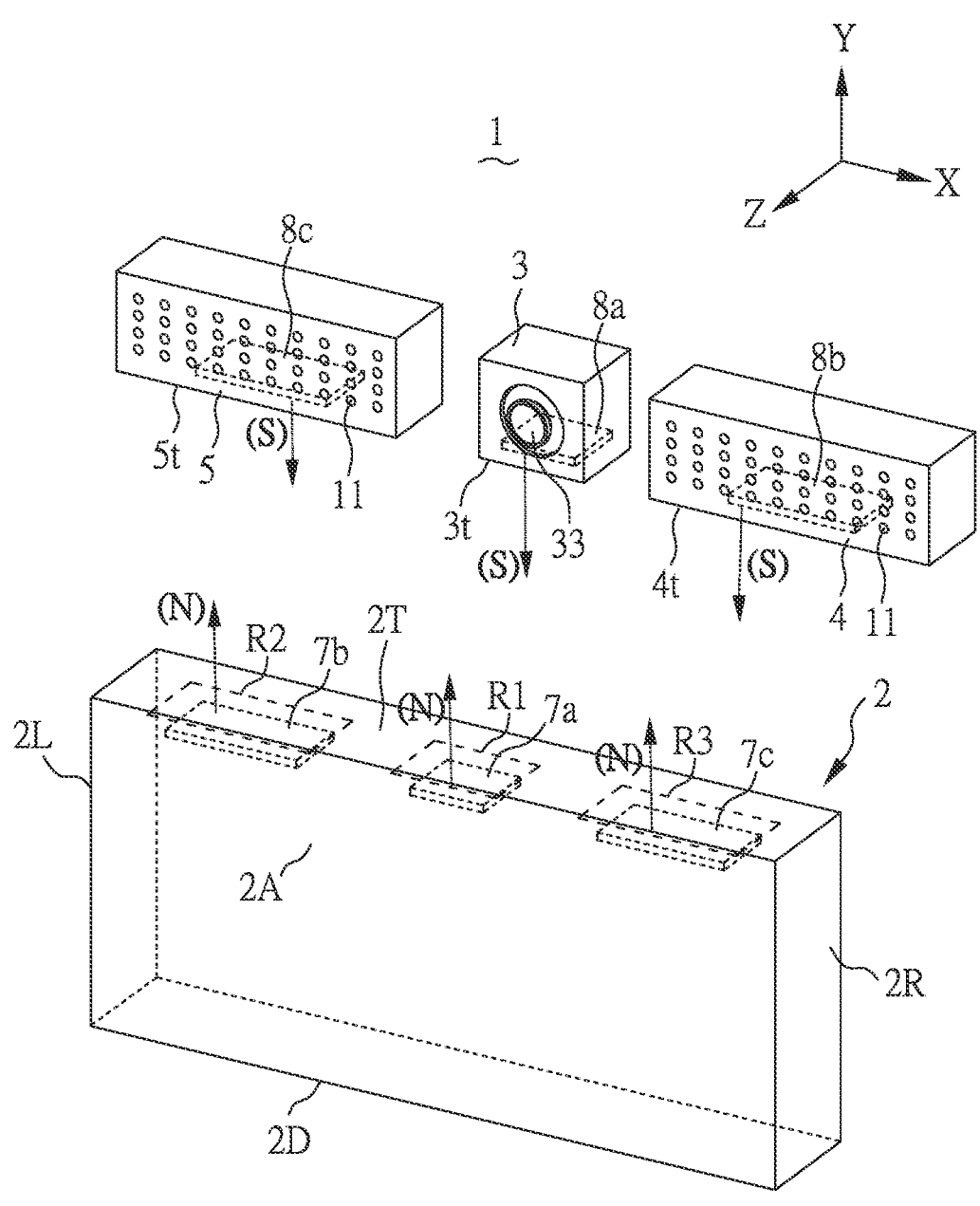
FIG. 3(B) is a perspective view of the configuration for the power supply device and audio-visual devices according to another embodiment of the present disclosure.
Figure 3C:
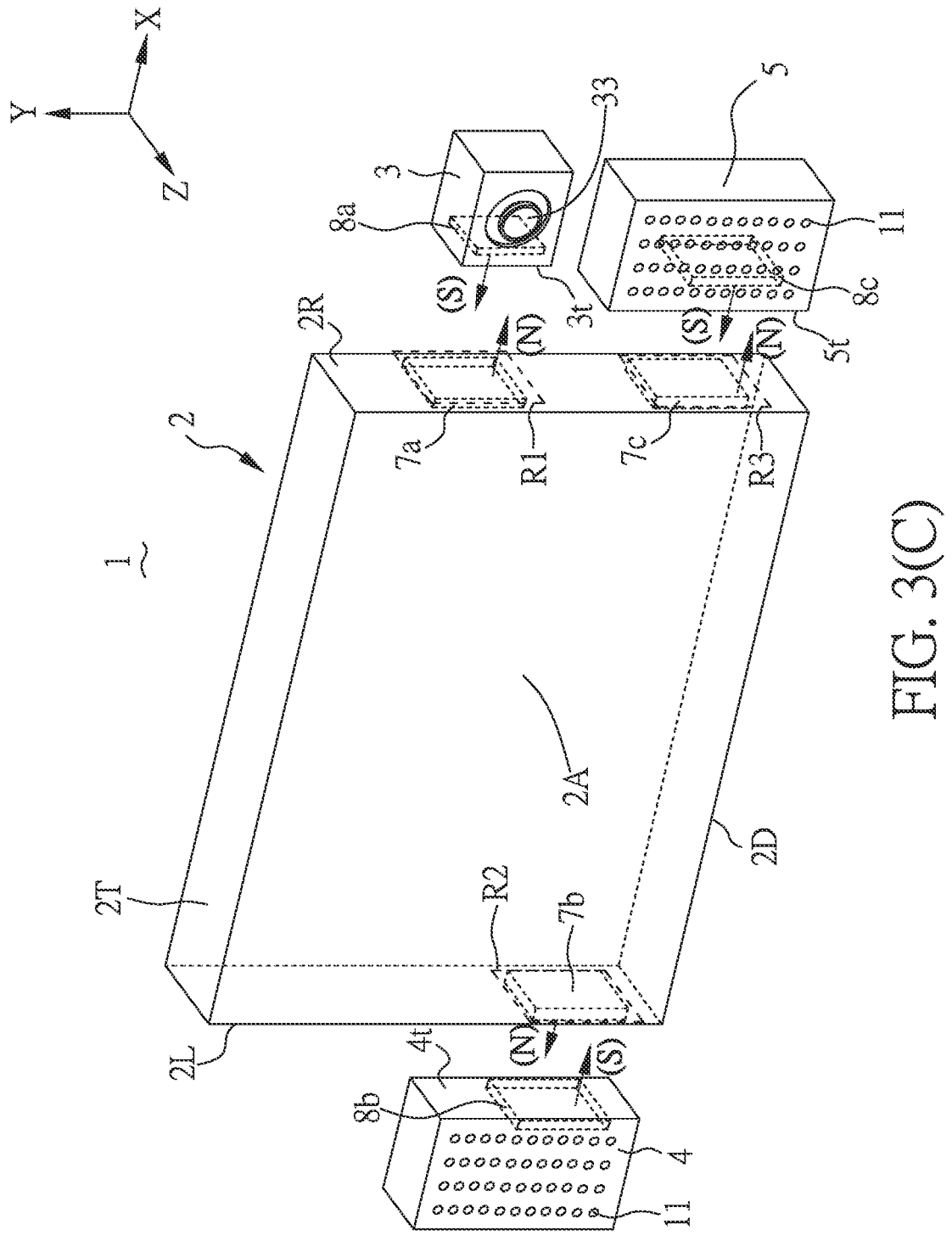
FIG. 3(C) is a perspective view of the configuration for the power supply device and audio-visual devices according to still another embodiment of the present disclosure.
Figure 3D:
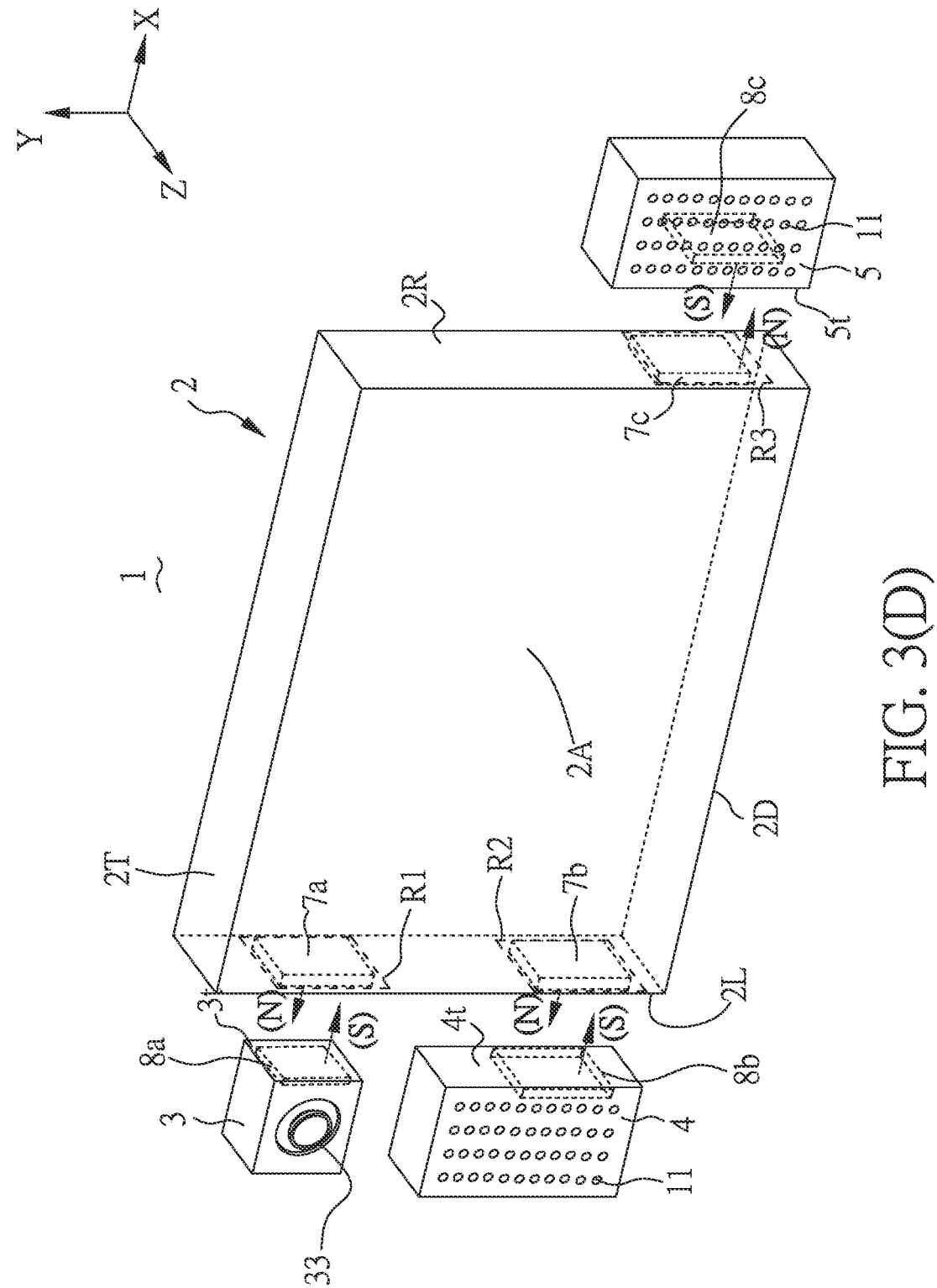
FIG. 3(D) is a perspective view of the configuration for the power supply device and audio-visual devices according to yet another embodiment of the present disclosure.
Figure 3E:
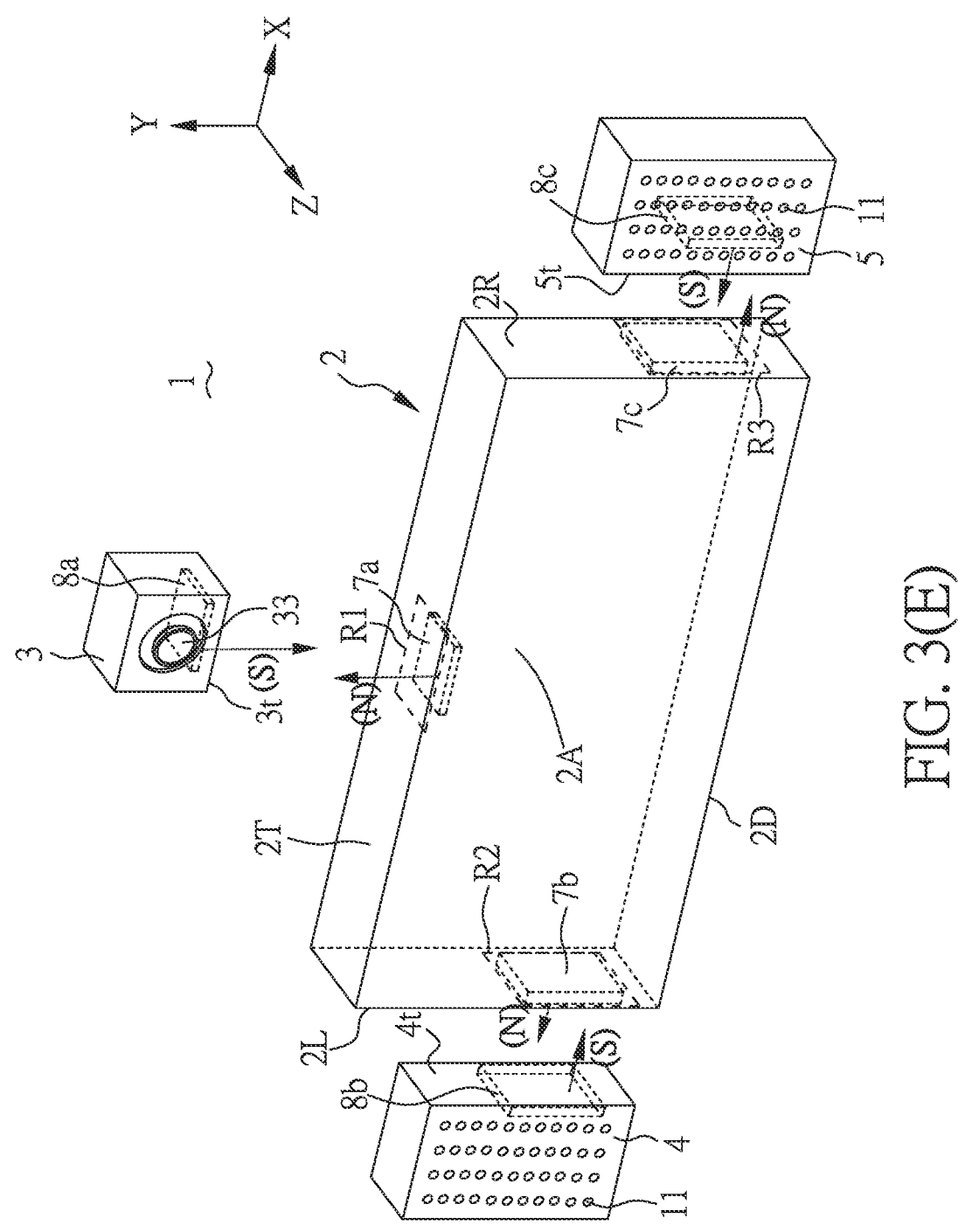
FIG. 3(E) is a perspective view of the configuration for the power supply device and audio-visual devices according to further another embodiment of the present disclosure.

In addition, in some embodiments, the power supply module 7 may also be arranged to be close to the first side surface 2L of the power supply device 2 or directly on the first side surface 2L; in other words, a plurality of power supply regions R may be respectively disposed the first side surface 2L of the power supply device 2 (with reference to FIGS. 3(C) to 3(E)). In another embodiment, the power supply module 7 may also be arranged to be close to the second side surface 2R of the power supply device 2 or directly on the second side surface 2R; in other words, the plurality of power supply regions R may be respectively disposed on the second side surface 2R of the power supply device 2 (with reference to FIG. 3(C) to 3(E)). Accordingly, the internal components of the power supply device 2 may be understood.

FIG. 2(C) is a schematic diagram (block diagram) illustrating the internal components of each audio-visual device 3~5 according to an embodiment of the present disclosure, and please refer to FIG. 2(C) and FIGS. 1(A) to 2(B) at the same time. For making the description clear, in FIG. 2(C), the direction extending from the left side to the right side of each audio-visual device 3~5 is represented by the second direction (X-direction), and the direction extending from the bottom to the top of each audio-visual device 3~5 is represented by the third direction (Y-direction). It is noted that the sizes, shapes, positions, relative positions, etc. of the components in the figures are only examples but not limitations.

First, the first audio-visual device 3 is described, wherein the first audio-visual device 3 is exemplified by a camera. As shown in FIG. 2(C), the first audio-visual device 3 may include a first charging module 8a, a wireless transmission device 31, a lens 32, an audio acquisition device 33 (such as but not limited to a microphone), and a light-emitting element 34 (such as but not limited to a flash). The first charging module 8a may include a rechargeable battery 81a and a magnetic member 82a. In addition, in one embodiment, the first charging module 8a may be arranged inside the first audio-visual device 3 and adjacent to one end portion 3t (for example, the top of the first audio-visual device 3 in FIG. 2(C) and FIG. 3(A)). However, the present disclosure is not limited thereto. Moreover, as shown in FIG. 2(A) to 2(C), in one embodiment, the magnetic member 82a of the first charging module 8a and the magnetic member 72 of the power supply module 7 may be provided with different magnetic polarities. When the first audio-visual device 3 is close to any power supply area R of the power supply device 2, a magnetic attraction effect may be generated between the first audio-visual device 3 and the power supply device 2. That is, the magnetic member 82a in the first charging module 8a of the first audio-visual device 3 may magnetically attract the magnetic member 72 of the power supply module 7 (such as but not limited to the first power supply module 7a) of the power supply device 2, so the first audio-visual device 3 may be coupled to the power supply device 2 through magnetic attraction. In one embodiment, when the first audio-visual device 3 is connected to any power supply region R, the power supply module 7 disposed in said power supply region R may charge the rechargeable battery 81a through the discharge coil 71. In some embodiments, the power supply module 7 may also charge the rechargeable battery 81a by wireless charging, but it is not limited thereto.

Next, the second audio-visual device 4 will be described by taking the first sound box as an example. As shown in FIG. 2(C), the second audio-visual device 4 may include a second charging module 8b, a wireless transmission device 41 and a speaker 42. The second charging module Sb may include a rechargeable battery 81b and a magnetic member 82b. In addition, in one embodiment, the second charging module 8b may be arranged to be adjacent to one end portion 4t of the second audio-visual device 4, as shown in FIG. 2(C) and FIG. 3(A). However, the present disclosure is not limited thereto. As shown in FIGS. 2(A) to 2(C), in one embodiment, the magnetic member 82b of the second charging module 8b and the magnetic member 72 of the power supply module 7 (such as but not limited to the second power supply module 7b) may be provided with different magnetic polarities. When the second audio-visual device 4 is close to any power supply area R of the power supply device 2, the magnetic attraction effect may be generated between the second audio-visual device 4 and the power supply device 2. Therefore, the second audio-visual device 4 may be coupled to the power supply device 2 to be charged by contact or in a wireless manner. However, the present disclosure is not limited thereto.

Next, the third audio-visual device 5 will be described by taking the second sound box as an example. As shown in FIG. 2(C), the third audio-visual device 5 may include a third charging module 8c, a wireless transmission device 51 and a speaker 52, wherein the third charging module 8c may include a rechargeable battery 81c and a magnetic member 82c. In addition, in one embodiment, the third charging module 8c may be arranged to be adjacent to one end portion 5t of the third audio-visual device 5, as shown in FIG. 2(C) and FIG. 3(A). However, the present disclosure is not limited thereto. In one embodiment, the third audio-visual device 5 may have magnetic polarity different from that of the magnetic member 72 of the power supply module 7 (such as but not limited to the third power supply module 7c) in the second direction (X-direction). When the third audio-visual device 5 is close to any power supply area R of the power supply device 2, the third audio-visual device 5 may be coupled to the power supply device 2 by the magnetic attraction effect to be charged by contact or in a wireless manner. However, the present disclosure is not limited thereto.

Please refer to FIG. 2(C) again. In one embodiment, the first audio-visual device 3 has a first side 3L and a second side 3R in the second direction (X-direction), wherein the first side 3L and/or the second side 3R may be provided with a first alignment member 9. For example, the first side 3L and the second side 3R are each provided with a first alignment member 9. In one embodiment, the second audio-visual device 4 has a first side 4L and a second side 4R in the second direction (X-direction), wherein the first side 4L or the second side 4R may be provided with a second alignment member 10, for example, the second side 4R being provided with a second positioning member 10. In one embodiment, the third audio-visual device 5 has a first side 5L and a second side 5R in the second direction (X-direction), wherein the first side 5L or the second side 5R may also be provided with a second alignment member 10, for example, the first side 5L being provided with a second alignment member 10.

In addition, in one embodiment, when the first audio-visual device 3 and the second audio-visual device 4 are connected or the first audio-visual device 3 and the third audio-visual device 5 are connected, the first alignment member 9 and the second alignment member 10 may be used to perform alignment and connection. In one embodiment, the types of the first alignment member 9 and the second alignment member 10 may include magnetic members, and the magnetic members may have different magnetic polarities. For example, the magnetic polarity of the first alignment member 9 in the direction of the second alignment member 10 may be, for example, the N pole, and the magnetic polarity of the second alignment member 10 in the direction of the first alignment member 9 may be, for example, the S pole. Therefore, when the first alignment member 9 and the second alignment member 10 are close to each other, a magnetic attraction effect may be generated therebetween. It is noted that the magnetic polarities indicated in FIG. 2(C) are only examples but not limitations. As a result, the first audio-visual device 3 and the second audio-visual device 4 may be in alignment connection, and the first audio-visual device 3 and the third audio-visual device 5 may also be in alignment connection. In other embodiments, the first alignment member 9 and the second alignment member 10 may also be physical connectors, and the physical connectors may be connected by, for example, engaging, pivoting, sticking, buckling, etc. and it is not limited thereto.

Accordingly; the internal components of the audio-visual devices 3~5 can be understood.

Next, the configuration for the power supply device 2 and the audio-visual devices 3~5 will be described. FIG. 3(A) is a perspective view of the configuration for the power supply device 2 and the audio-visual devices 3 to 5 according to an embodiment of the present disclosure, and please refer to FIG. 3(A) and FIGS. 1(A) to 2(C) at the same time. The internal components of the power supply device 2 may be seen by referring to the embodiment of FIG. 2(A), and the internal components of the audio-visual devices 3 to 5 may be seen by referring to the embodiment of FIG. 2(C).

As shown FIG. 3(A), the first power supply region R1, the second power supply region R2 and the third power supply region R3 of the power supply device 2 are disposed on the bottom surface 2D of the power supply device 2, wherein the first power supply region R1 is disposed on the middle portion of the bottom surface 2D, and the second power supply region R2 and the third power supply region R3 are respectively disposed on opposite sides of the first power supply region R1; for example, the second power supply region R2 may be disposed on the left-side portion of the bottom surface 2D in the second direction (X-direction), and the third power supply region R3 may be disposed on the right-side portion of the bottom surface 2D in the second direction (X-direction).

As shown in FIG. 2(A) and FIG. 3(A), the magnetic polarity of the magnetic member 72 of the first power supply module 7a, the magnetic member 72 of the second power supply module 7b or the magnetic; member of the third power supply module 7c in the direction (for example, the opposite direction of the Y-direction) facing the magnetic member 82a of the first charging module 8a, the magnetic member 82b of the second charging module 8b or the magnetic member 82c of the third charging module 8c may be, for example, N pole, while the magnetic polarity of the magnetic member 82a of the first charging module 8a, the magnetic member 82b of the second charging module 8b or the magnetic member 82c of the third charging module 8c in the direction (for example, the Y-direction) facing the magnetic member 72 of the first power supply module 7a, the magnetic member 72 of the second power supply module 7b or the magnetic member 72 of the third power supply module 7c may be S pole. Therefore, the first power supply module 7a, the second power supply module 7b or the third power supply module 7c may be connected to the first charging module 8a, the second charging module 8b or the third charging module 8c through magnetic attraction. It is noted that the magnetic polarities indicated in FIG. 3(A) are only examples but not limitations.

As shown in FIG. 3(A), the end portion 3t of the first audio-visual device 3 may be connected to the first power supply region R1 (i.e., connected to the bottom surface 2D), and the first power supply module 7a may perform charging on the first charging module 8a. The end portion 4t of the second audio-visual device 4 may be connected to the second power supply region R2 (i.e., connected to the bottom surface 2D), and the second power supply module 7b may perform charging on the second charging module 8b. The end portion 5t of the third audio-visual device 5 may be connected to the third power supply region R3 (i.e., connected to the bottom surface 2D), and the third power supply module 7c may perform charging on the third charging module 8c. In addition, according to other embodiments (although not shown in the figure), the first audio-visual device 3 may be connected to the second power supply region R2 or the third power supply region R3 to perform charging, the second audio-visual device 4 may be connected to the first power supply region R1 or the third power supply area R3 to perform charging, and the third audio-visual device 5 may be connected to the second power supply area R2 or the first power supply area R1 to perform charging.

FIG. 3(B) is a perspective view of the configuration for the power supply device 2 and the audio-visual devices 3 to 5 according to another embodiment of the present disclosure, and please refer to FIG. 3(A) and FIGS. 1(A) to 3(A) at the same time. The internal components of the power supply device 2 may be seen by referring to the embodiment of FIG. 2(A), and the internal components of the audio-visual devices 3 to 5 may be seen by referring to the embodiment of FIG. 2(B). Since some features of the embodiment of FIG. 3(B) can be applied to the description for the embodiment of FIG. 3(A), only the differences therebetween will be described below.

As shown in FIG. 3(B), the first power supply region R1, the second power supply region R2 and the third power supply region R3 may be disposed on the top surface 2T of the power supply device 2. Therefore, each of the audio-visual devices 3 to 5 may be connected to the top surface 2T of the power supply device 2 to be charged.

When the first audio-visual device 3 (for example, a video camera) is arranged in the middle portion of the top surface 2T, the second audio-visual device 4 (for example, a sound box) may be arranged on the left side or right side of the first audio-visual device 3 (for example, a video camera), and the third audio-visual device 5 (for example, a sound box) may be disposed on the right side or left side of the first audio-visual device 3 (for example, a video camera), but it is not limited thereto. In one embodiment, the audio played by the second audio-visual device 4 and the third audio-visual device 5 may be adjusted through software. For example, if the second audio-visual device 4 is preset to play the audio of the left channel and the third audio-visual device 5 is preset to play the audio of the right channel, when the second audio-visual device 4 is arranged on the right side of the first audio-visual device 3 and the third audio-visual device 5 is arranged on the left side of the first audio-visual device 3 (as shown in FIG. 3(B)), the software may be used to automatically adjust the audio played by the second audio-visual device 4 and the third audio-visual device 5, so that the second audio-visual device 4 is changed to play the audio of the right channel, and the third audio-visual device is changed to play the audio of the left channel. As a result, the first audio-visual device 4 and the second audio-visual device 5 may be arbitrarily connected to different power supply regions R1~R3, and the software can adjust audio played by the second audio-visual device 4 and the third audio-visual device 5 according to the positions of the first audio-visual device 4 and the second audio-visual device 5. According to some embodiments, the user can arrange the audio-visual devices on different power supply areas of the power supply device 2 based on actual requirements. For example, the first audio-visual device 3 (for example, a video camera) may be arranged on the bottom surface, the top surface, or the side surface of the power supply device 2.)

FIG. 3(C) is a perspective view of the configuration for the power supply device 2 and the audio-visual devices 3~5 according to still mother embodiment of the present disclosure, and please refer to FIG. 3(C) and FIGS. 1(A) to 3(B) at the same time. The internal components of the power supply device 2 may be seen by referring to the embodiment of FIG. 2(A), and the internal components of the audio-visual devices 3 to 5 may be seen by referring to the embodiment of FIG. 2(B). Since some features of the embodiment of FIG. 3(C) can be applied to the description for the embodiment of FIG. 3(A), only the differences therebetween will be described below.

As shown in FIG. 3(C), the first power supply region R1 and the third power supply region R3 may be disposed on the second side surface 2R of the power supply device 2, and the second power supply region R2 may be disposed on the first side surface 2L of the power supply device 2. The end portion 3t of the first audio-visual device 3 may be connected to the first power supply region R1, the end portion 4t of the second audio-visual device 4 may be connected to the second power supply region R2, and the end portion 5t of the third audio-visual device 5 may be connected to the third power supply region R3, but it is not limited thereto. Accordingly, each of the audio-visual devices 3 to 5 may be coupled to the left and right sides of the power supply device 2 in the second direction (X-direction) to be charged.

FIG. 3(D) is a perspective view of the configuration for the power supply device 2 and the audio-visual devices 3~5 according to yet another embodiment of the present disclosure, and please refer to FIG. 3(D) and FIGS. 1(A) to 3(C) at the same time. The internal components of the power supply device 2 may be seen by referring to the embodiment of FIG. 2(A), and the internal components of the audio-visual devices 3 to 5 may be seen by referring to the embodiment of FIG. 2(B). Since some features of the embodiment of FIG. 3(D) can be applied to the description for the embodiment of FIG. 3(A), only the differences therebetween will be described below.

As shown in FIG. 3(D), the first power supply region R1 and the second power supply region R2 may be arranged on the first side surface 2L of the power supply device 2, and the third power supply region R3 may be arranged on the second side surface 2R of the power supply device 2. At this moment, the end portion 3t of the first audio-visual device 3 may be connected to the first power supply region R1, the end portion 4t of the second audio-visual device 4 may be connected to the second power supply region R2, and the end portion 5t of the third audio-visual device 5 may be connected to the third power supply region R3, but it is not limited thereto. Therefore, the audio-visual devices 3 to 5 may be coupled to the left and right sides of the power supply device 2 in the second direction (X-direction) for being charged.

FIG. 3(E) is a perspective view of the configuration for the power supply device 2 and the audio-visual devices 3-5 according to further another embodiment of the present disclosure, and please refer to FIG. 3(E) and FIGS. 1(A) to 3(D) at the same time. The internal components of the power supply device 2 may be seen by referring to the embodiment of FIG. 2(A), and the internal components of the audio-visual devices 3 to 5 may be seen by referring to the embodiment of FIG. 2(B). Since some features of the embodiment of FIG. 3(E) can be applied to the description for the embodiment of FIG. 3(A), only the differences therebetween will be described below.

As shown in FIG. 3(E), the first power supply region R1 may be arranged on the top surface 21 of the power supply device 2, the second power supply region R2 may be arranged on the first side surface 2L of the power supply device 2, and the third power supply region R3 may be arranged on the second side surface 2R of the power supply device 2. At this moment, the end portion 3t of the first audio-visual device 3 may be connected to the first power supply region R1, the end portion 4t of the second audio-visual device 4 may be connected to the second power supply region R2, and the end portion 5t of the third audio-visual device 5 may be connected to the third power supply region R3. Therefore, the first audio-visual device 3 may be coupled to the top surface 2T of the power supply device 2, and the second audio-visual device 4 and the third audio-visual device 5 may be coupled to the left side surface 2L and the right side surface 2R of the power supply device 2 in the second direction (X-direction) for being charged.

In another embodiment, the first power supply region R1 may be changed to be arranged on the bottom surface 21) of the power supply device 2 (with reference to FIG. 3(A)), the second power supply region R2 may be arranged on the first side surface 2L of the power supply device 2, and the third power supply region R3 may be arranged on the second side surface 2R of the power supply device 2. Therefore, the first audio-visual device 3 may be coupled to the bottom surface 2D of the power supply device 2, and the second audio-visual device 4 and the third audio-visual device 5 may be coupled to the left side surface 2L and the right side surface 2R of the power supply device 2 in the second direction (X-direction) for being charged.

As a result, the configuration for the power supply device 2 (for example, the display device) and the audio-visual devices 3 to 5 can be understood. It is noted that the aforementioned configurations are only examples, and the present disclosure is not limited thereto.

The power supply device 2 of the present disclosure may also be a charging base, such as a wireless charging board, but it is not limited thereto. When the power supply device 2 is a charging base, the configuration for the power supply device 2 and the audio-visual devices 3 to 5 will be described below.

Figure 4A:
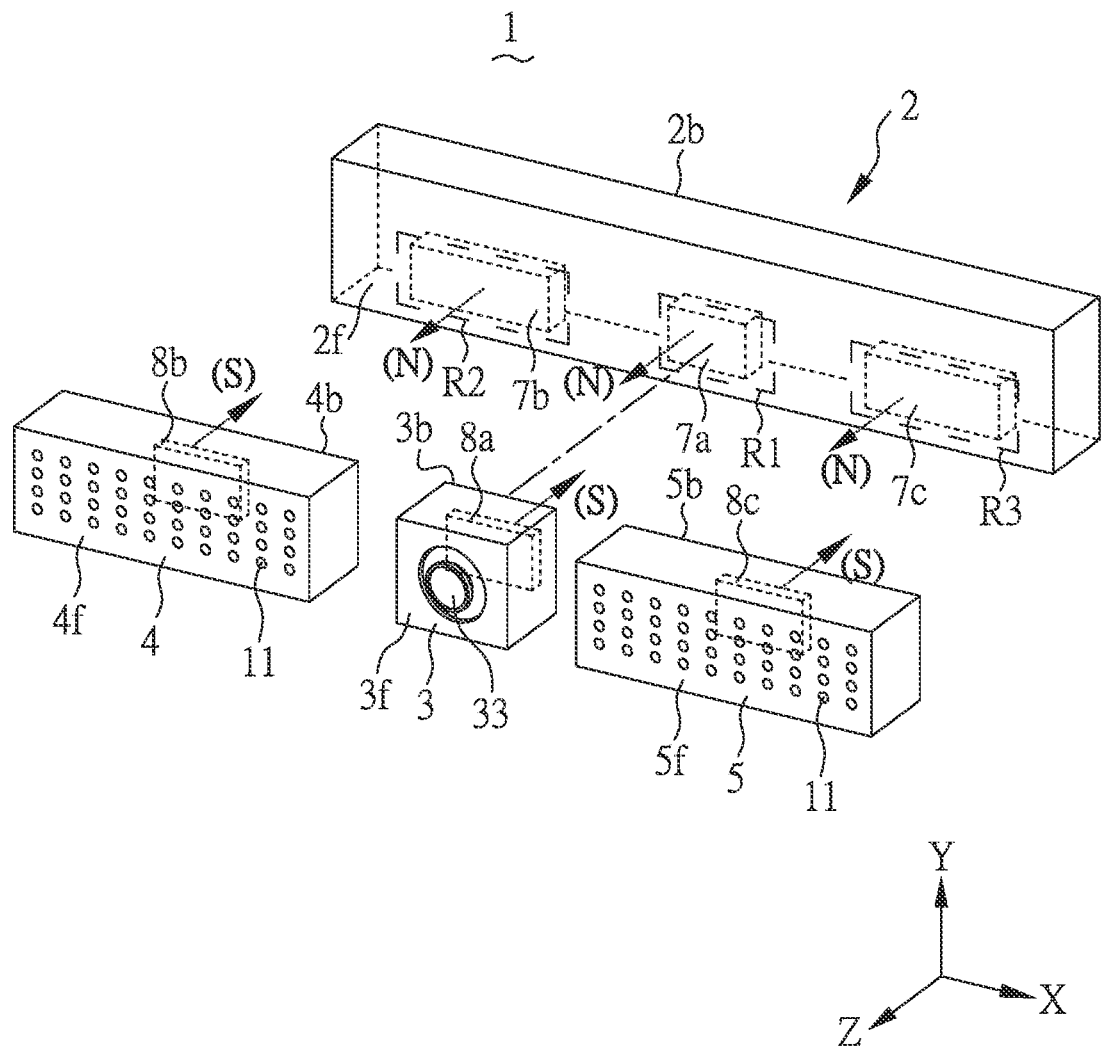
FIG. 4(A) is a perspective view of the configuration for the power supply device and audio-visual devices according to still further another embodiment of the present disclosure.

FIG. 4(A) is a perspective view of the configuration for the power supply device 2 (for example, a charging base) and audio-visual devices 3 to 5 according to still further another embodiment of the present disclosure, and please refer to FIG. 4(A) and FIGS. 1 to 3(F) at the same time. Since some details of the power supply device 2 and the audio-visual devices 3 to 5 can be applied to the description for the embodiments of FIGS. 2(A), 2(B) and 3(A), a detailed description is deemed unnecessary and only the differences therebetween are given directly in the followings.

As shown in FIG. 4(A), the shape of the power supply device 2 may be a cuboid, a rectangular body, a cylinder or other three-dimensional shapes, but it is not limited thereto. The power supply device 2 may include a first surface 2f and a second surface 2b, wherein the first surface 2f and the second surface 2b are opposite to each other. The first surface 2f may be provided with a first power supply region R1, a second power supply region R2 and a third power supply region R3, while the second surface 2b may be arranged on a plane, for example, attached to or suspended on a wall (not shown in FIG. 4(A), but it is not limited thereto.

In addition, the first audio-visual device 3 may include a first surface 3f and a second surface 3b, and the first surface 3f and the second surface 3b are opposite to each other. The lens 33 may be exposed on the first surface 3f The first charging module 8a may be arranged inside the first audio-visual device 3 and adjacent to the second surface 3b. The first audio-visual device 3 is detachably connected to the power supply device 2. When the first audio-visual device 3 is connected to the power supply device 2, for example, the second surface 3b of the first audio-visual device 3 being connected to the first power supply region R1, the power supply device 2 may charge the first audio-visual device 3.

The second audio-visual device 4 may include a first surface 4f and a second surface 4b, and the first surface 4f and the second surface 4b are opposite to each other. The second audio-visual device 4 may be a sound box, and the first surface 4f may be a sound output surface, which is provided with a plurality of sound output holes 11. The second charging module 8b may be arranged inside the second audio-visual device 4 and adjacent to the second surface 4b. The second audio-visual device 4 is detachably connected to the power supply device 2. When the second audio-visual device 4 is connected to the power supply device 2, for example, the second surface 4b of the second audio-visual device 4 being connected to the second power supply region R2, the power supply device 2 may charge the second audio-visual device 4.

The third audio-visual device 5 may include a first surface 5f and a second surface 5b, and the first surface 5f and the second surface 5b are opposite to each other. The third audio-visual device 5 may be a sound box, and the first surface 5f may be a sound output surface, which is provided with a plurality of sound output holes 11. The third charging module 8c may be disposed inside the third audio-visual device 5 and adjacent to the second surface 5b. The second surface 5b of the third audio-visual device 5 may be connected to the third power supply region R3 for perform charging.

As a result, when the power supply device 2 (for example, the charging base) is attached to the wall, the audio-visual devices 3 to 5 may be coupled to the first surface 2f of the power supply device 2 for being charged.

Figure 4B:
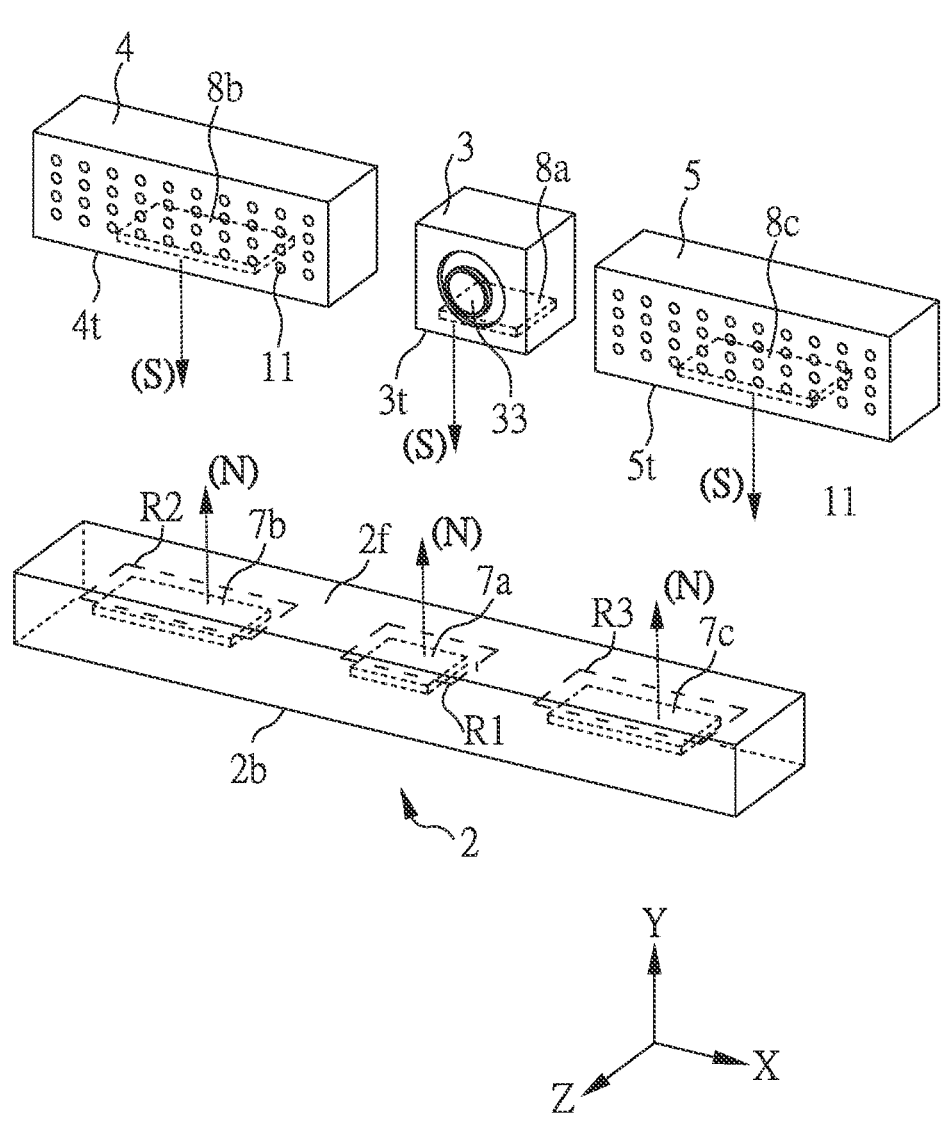
FIG. 4(B) is a perspective view of the configuration for the power supply device and audio-visual devices according to yet further another embodiment of the present disclosure.

FIG. 4(B) is a perspective view of the configuration for the power supply device 2 (for example, a charging base) and audio-visual devices 3 to 5 according to yet further another embodiment of the present disclosure, and please refer to FIG. 4(B) and FIGS. 1 to 4(A) at the same time. Since some details of the power supply device 2 and the audio-visual devices 3 to 5 can be applied to the description for the embodiments of FIGS. 2(A), 2(B), 3(B) and 4(A), only the differences therebetween are given directly in the followings.

As shown in FIG. 4(B), the power supply device 2 may be placed on a plane (for example, a desktop) and, at this moment, the first surface 2f may be provided with a first power supply region R1, a second power supply region R2 and a third power supply regions R3. The second surface 2b may be attached to the desktop. In this case, the first charging module 8a of the first audio-visual device 3 may be arranged to be adjacent to the end portion 3t, the second charging module 8b of the second audio-visual device 4 may be arranged to be adjacent to the end portion 4t, and the third charging module 8c of the third audio-visual device 5 may be arranged to be adjacent to the end portion 5t. In addition, the configuration for the power supply device 2, the first audio-visual device 3, the second audio-visual device 4 and the third audio-visual device 5 is similar to the embodiment of FIG. 3(B).

Therefore, when the power supply device 2 (for example, the charging base) is placed on the desktop, the audio-visual devices 3 to 5 may be coupled to the first surface 2f of the power supply device 2.

The aforementioned configurations are only examples, and the present disclosure is not limited thereto.

Figure 5:
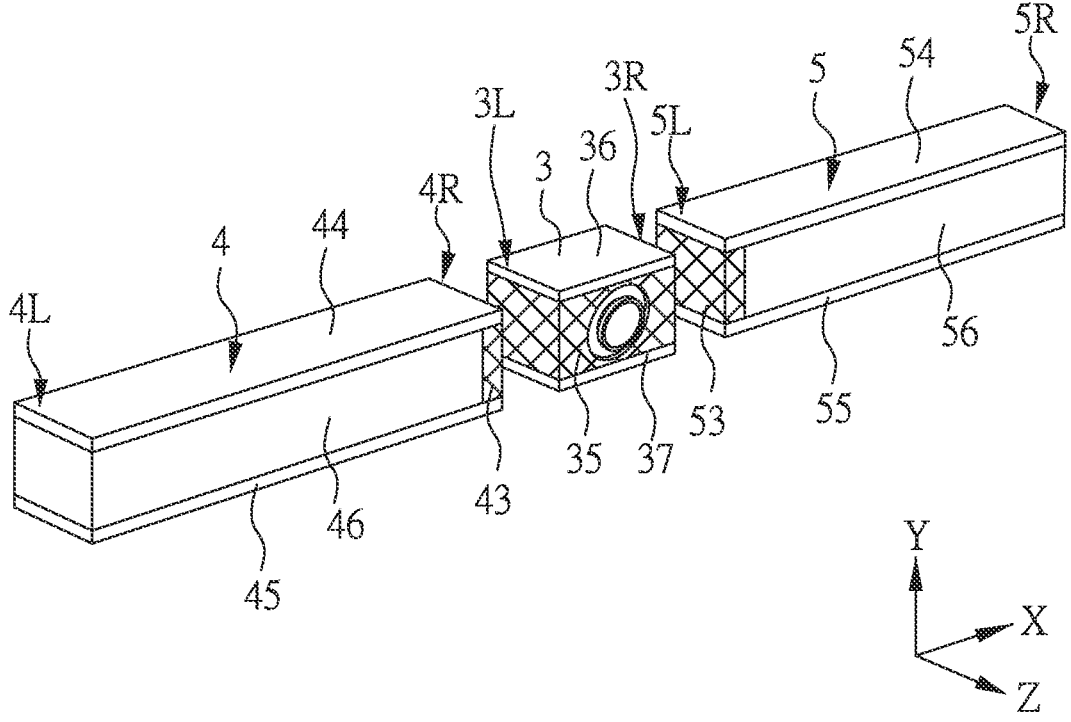
FIG. 5 is a schematic diagram illustrating the appearance configuration for the audio-visual devices according to an embodiment of the present disclosure.

Next, the appearance designs of the audio-visual devices 3 to 5 will be described. FIG. 5 is a schematic diagram illustrating the appearance configuration for the audio-visual devices 3 to 5 according to an embodiment of the present disclosure. As shown in FIG. 5, the first audio-visual device 3 may have a casing body 35, an upper cover 36 and a lower cover 37. The second audio-visual device 4 may have an outer frame 43, an upper cover 44, a lower cover 45 and a main body 46, wherein the outer frame 43 is arranged on the second side 4R of the second audio-visual device 4. The third audio-visual device 5 may have an outer frame 53, an upper cover 54, a lower cover 55 and a main body 56, wherein the outer frame 53 is arranged on the first side 5L of the third audio-visual device 5.

In one embodiment, the top cover 36 of the first audio-visual device 3, the top cover 44 of the second audio-visual device 4, and the top cover 54 of the third audio-visual device 5 may have the same color or material, or may have a continuous pattern. In one embodiment, the lower cover 37 of the first audio-visual device 3, the lower cover 45 of the second audio-visual device 4, and the lower cover 55 of the third audio-visual device 5 may have the same color or material, or may have a continuous pattern. In one embodiment, the casing body 35 of the first audio-visual device 3, the outer frame 43 of the second audio-visual device 4 and the outer frame 53 of the third audio-visual device 5 may have the same color or material, or may have a continuous pattern. Therefore, when the second side 4R of the second audio-visual device 4 is arranged to be adjacent to the first side 3L of the first audio-visual device 3, and the first side 5L of the third audio-visual device 5 is arranged to be adjacent to the second side 3R of the first audio-visual device 3, it is able to present continuity in the appearance design. However, the present disclosure is not limited thereto.

In one embodiment, the electronic device 1 obtained in the aforementioned embodiments may be a touch device. Furthermore, if the electronic device obtained in the aforementioned embodiments of the present disclosure is in the form of a display device or a touch display device, it can be applied to any product known in the art that requires a display device, such as monitors, mobile phones, notebook computers, video cameras, cameras, music players, mobile navigation devices, TVs, car dashboards, center consoles, electronic rearview mirrors, head-up displays, and products that need to display images.

In one embodiment, the present disclosure may at least determine whether the product falls within the scope of patent protection of the present disclosure by comparing the presence or absence of components, but it is not limited thereto.

Accordingly, the present disclosure provides an electronic device, wherein the first audio-visual device is detachably connected to the power supply device and, when the first audio-visual device is connected to the power supply device, the power supply device may charge the first audio-visual device. According to some embodiments, the problems of having exposed wires or disordered wires between the electronic device and the external sound boxes or external video camera in the prior art can be solved.

The features of the various embodiments of the present disclosure may be arbitrarily mixed and matched as long as they do not violate the spirit of the disclosure or conflict with each other.

The aforementioned specific embodiments should be construed as merely illustrative, and not limiting the rest of the present disclosure in any way.

What is claimed is:

1. An electronic device, comprising:
   a power supply device, wherein the power supply device is a charging base;
   a first audio-visual device detachably connected to the power supply device;
   a second audio-visual device detachably connected to the power supply device; and
   a third audio-visual device detachably connected to the power supply device, wherein the power supply device charges the third audio-visual device when the third audio-visual device is connected to the power supply device, and wherein the first audio-visual device is a video camera, the second audio-visual device is a first sound box and the third audio-visual device is a second sound box,
   wherein, when the first audio-visual device is connected to the power supply device, the power supply device charges the first audio-visual device.

2. The electronic device of claim 1, wherein the first audio-visual device includes a first charging module, the power supply device includes a first power supply module disposed in a first power supply area of the power supply device, wherein the first power supply module performs charging on the first charging module when the first audio-visual device is connected to the first power supply area of the power supply device, and wherein each of the first power supply module and the first charging module includes a magnetic member, and the magnetic member of the first power supply module and the magnetic member of the first charging module have different magnetic polarities.

3. The electronic device of claim 1, wherein the first audio-visual device is detachably connected to the second audio-visual device, the first audio-visual device includes a first alignment member, and the second audio-visual device includes a second alignment piece, in which, when the first audio-visual device and the second audio-visual device are connected, the first alignment member and the second alignment member are in alignment connection.

4. The electronic device of claim 3, wherein each of the first alignment member and the second alignment member is a magnetic member, and the first alignment member and the second alignment member have different magnetic polarities.

5. The electronic device of claim 1, wherein each of the first audio-visual device and the second audio-visual device includes a wireless transmission device, wherein the first audio-visual device performs signal transmission with the power supply device through the wireless transmission device of the first audio-visual device when the first audio-visual device is separated from the power supply device, and wherein the second audio-visual device performs signal transmission with the power supply device through the wireless transmission device of the second audio-visual device when the second audio-visual device is separated from the power supply device.

6. The electronic device of claim 2, wherein the second audio-visual device includes a second charging module, and the power supply device includes a second power supply module disposed in a second power supply area of the power supply device, wherein the second power supply module performs charging on the second charging module when the second audio-visual device is connected to the second power supply area of the power supply device, and wherein the power supply device has a first surface, and the first power supply area and the second power supply area are disposed on the first surface.

7. The electronic device of claim 2, wherein the second audio-visual device includes a second charging module, and the power supply device includes a second power supply module disposed in a second power supply area of the power supply device, wherein the second power supply module performs charging on the second charging module when the second audio-visual device is connected to the second power supply area of the power supply device, and wherein the power supply device has a first surface and a second surface, the first power supply area is disposed on the first surface, and the second power supply area is disposed on the second surface.

8. An electronic device, comprising:
a power supply device, wherein the power supply device is a display device;
a first audio-visual device detachably connected to the power supply device;
a second audio-visual device detachably connected to the power supply device; and
a third audio-visual device detachably connected to the power supply device, wherein the power supply device charges the third audio-visual device when the third audio-visual device is connected to the power supply device,
wherein the first audio-visual device is a video camera, the second audio-visual device is a first sound box, the third audio-visual device is a second sound box, the charging device provides audio of different channels to the second audio-visual device and the third audio-visual device, and the second audio-visual device and the third audio-visual device play audio of different channels, respectively.

9. The electronic device of claim 8, wherein the power supply device includes a bottom surface, a top surface, a first side surface, a second side surface and a display surface, wherein the top surface is disposed above the display surface, the bottom surface is disposed below the display surface, the first side surface is disposed on the left side of the display surface, and the second side surface is display on the right side of the display surface.

10. The electronic device of claim 9, wherein a first power supply region, a second power supply region and a third power supply region of the power supply device are disposed on the bottom surface of the power supply device, in which the first power supply region is disposed in a middle portion of the bottom surface, and the second power supply region and the third power supply region are respectively disposed on opposite sides of the first power supply region.

11. The electronic device of claim 9, wherein a first power supply region, a second power supply region and a third power supply region of the power supply device are disposed on the top surface of the power supply device.

12. The electronic device of claim 9, wherein a first power supply region and a third power supply region of the power supply device are disposed on the second side surface of the power supply device, and a second power supply region of the power supply device is disposed on the first side surface of the power supply device.

13. The electronic device of claim 9, wherein a first power supply region and a second power supply region of the power supply device are disposed on the first side surface of the power supply device, and a third power supply region of the power supply device is disposed on the second side surface of the power supply device.

14. The electronic device of claim 8,
wherein the first audio-visual device includes a first charging module, the power supply device includes a first power supply module disposed in a first power supply area of the power supply device,
wherein the first power supply module performs charging on the first charging module when the first audio-visual device is connected to the first power supply area of the power supply device, and
wherein each of the first power supply module and the first charging module includes a magnetic member, and the magnetic member of the first power supply module and the magnetic member of the first charging module have different magnetic polarities.

15. The electronic device of claim 8, wherein the first audio-visual device is detachably connected to the second audio-visual device, the first audio-visual device includes a first alignment member, and the second audio-visual device includes a second alignment piece, in which, when the first audio-visual device and the second audio-visual device are connected, the first alignment member and the second alignment member are in alignment connection.

16. The electronic device of claim 15, wherein each of the first alignment member and the second alignment member is a magnetic member, and the first alignment member and the second alignment member have different magnetic polarities.

17. The electronic device of claim 8,
wherein each of the first audio-visual device and the second audio-visual device includes a wireless transmission device,
wherein the first audio-visual device performs signal transmission with the power supply device through the wireless transmission device of the first audio-visual device when the first audio-visual device is separated from the power supply device, and
wherein the second audio-visual device performs signal transmission with the power supply device through the wireless transmission device of the second audio-visual device when the second audio-visual device is separated from the power supply device.

* * * * *